United States Patent
Baluch et al.

(10) Patent No.: US 10,061,604 B2
(45) Date of Patent: Aug. 28, 2018

(54) PROGRAM EXECUTION RECORDING AND PLAYBACK

(71) Applicant: Red Hat, Inc., Raleigh, NC (US)

(72) Inventors: Marek Baluch, Brno (CZ); Jiri Sedlacek, Brno (CZ)

(73) Assignee: Red Hat, Inc., Raleigh, NC (US)

(*) Notice: Subject to any disclaimer, the term of this patent is extended or adjusted under 35 U.S.C. 154(b) by 0 days.

(21) Appl. No.: 15/232,758

(22) Filed: Aug. 9, 2016

(65) Prior Publication Data

US 2018/0046484 A1 Feb. 15, 2018

(51) Int. Cl.
*G06F 9/455* (2018.01)
*G06F 17/30* (2006.01)

(52) U.S. Cl.
CPC .... *G06F 9/45558* (2013.01); *G06F 17/30356* (2013.01); *G06F 2009/4557* (2013.01)

(58) Field of Classification Search
None
See application file for complete search history.

(56) References Cited

U.S. PATENT DOCUMENTS

| | | |
|---|---|---|
| 6,101,524 A | 8/2000 | Choi et al. |
| 6,832,367 B1 * | 12/2004 | Choi .................. G06F 11/3664 714/E11.207 |
| 8,495,008 B2 | 7/2013 | Ewing et al. |
| 8,499,299 B1 | 7/2013 | Jakab et al. |
| 8,656,222 B2 | 2/2014 | Chow et al. |
| 8,826,273 B1 * | 9/2014 | Chen .................. G06F 9/45558 718/1 |

(Continued)

FOREIGN PATENT DOCUMENTS

| | | |
|---|---|---|
| CN | 104598232 A | 5/2015 |
| WO | 2015172326 A1 | 11/2015 |

OTHER PUBLICATIONS

Matos et al., "Java Solutions to Record / Replay Executed Code in a JVM", <stackoverflow.com/questions/6694326/java-solutions-to-record-replay-exetcuted-code-in-a-jvm>, published on Jun. 14, 2015, 2 pages.

(Continued)

*Primary Examiner* — Emerson Puente
*Assistant Examiner* — Steven Do
(74) *Attorney, Agent, or Firm* — Lowenstein Sandler LLP (57) ABSTRACT

A computer system receives a first instruction identifier identifying a first instruction being executed by a first thread associated with a first virtual machine and receives a second instruction identifier identifying a second instruction being executed by a second thread associated with the first virtual machine. The system produces an execution record comprising the first instruction identifier, a first thread identifier identifying the first thread, a first timestamp reflecting a first real-time clock value associated with executing the first instruction, the second instruction identifier, a second thread identifier identifying the second thread, and a second timestamp reflecting a second real-time clock value associated with executing the second instruction. The system executes the first instruction by a first replay thread of a second virtual machine and the second instruction by a second replay thread of the second virtual machine in a chronological order specified by the first timestamp and the second timestamp.

20 Claims, 7 Drawing Sheets

(56) References Cited

U.S. PATENT DOCUMENTS

| | | |
|---|---|---|
| 9,052,967 B2 | 6/2015 | Gao et al. |
| 2010/0005464 A1* | 1/2010 | Malyugin ............ G06F 11/3414 |
| | | 718/1 |
| 2014/0372990 A1 | 12/2014 | Strauss |
| 2015/0046909 A1 | 2/2015 | Ligman et al. |
| 2016/0299760 A1* | 10/2016 | Gottschlich ......... G06F 11/3664 |

OTHER PUBLICATIONS

Konuru et al., "Deterministic Replay of Distributed Java Applications", <citeseerx.ist.edu/viewdoc/download?doi=10.1.1.111.3416& rep=1&type=>, Parallel and Distributed Processing Symposium, IBM Thomas J. Watson Research Center, published in 2000, 9 pages, IEEE, 30 Saw Mill River Road, Hawthorne, NY 10532.
Itskova, "Echo: A deterministic record/replay framework for debugging multithreaded applications", <imperial.ac.uk/pls/portallive/docs/1/18619711>, Jun. 14, 2006, 81 pages, Imperial College, London.

\* cited by examiner

PROGRAM EXECUTION RECORDING AND PLAYBACK

TECHNICAL FIELD

The present disclosure is generally related to recording and playing back execution of programs during debugging procedures.

DESCRIPTION OF THE RELATED ART

During development of a computer program, viewing the executed instructions of the program may aid debugging of the program.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

In the process of developing a program, a developer may use a debugging interface to view the operation of the program as it is executed by a computer system. For example, a debugging interface may provide an indication of performance statistics, errors, or other information as a program to be debugged is run by the computer system. In order to reproduce errors recognized during operation of a program, an execution recorder may record the instructions executed by the program. The record generated by the execution recorder may then be used to playback the operations of the program to identify the cause of errors.

Some programs may run multiple threads on separate processors or on a single processor. The threads may be independent paths of execution for components of a computer program. Each thread may be scheduled to execute instructions on a processor based on an operating system on which the program is running. If multiple threads are scheduled to the same processor, one or more of the threads may be paused while another thread executes. Depending on a scheduling process of the associated operating system, the threads may not be performed in the same order by different operating systems or during different execution runs of the program on a single operating system. However, conventional debugging interfaces may not record and replay a program's execution using the threads associated with executed instructions. This may result in a replay performing differently than the recorded execution of a program. Accordingly, an execution recorder is disclosed that records executed instructions with thread identifiers. A replay service of the execution recorder may then replay the recorded execution accurately based on the execution order of the threads and timestamps associated with executed instructions. Using timestamps and thread identifiers enables the disclosed execution recorder to replay the instructions executed by a program that has multiple threads in a deterministic manner unlike conventional debugging interfaces.

An execution recorder may include a recorder service, a playback service, and a data provider service. The recorder service may generate a file comprising an execution record based on running an instance of the program. The playback service may interpret the file produced by the recorder service to playback the execution of the program. In order to use the same data values for arguments during playback as during the original execution, the execution recorder may also have a data provider service. The data provider service may provide data values to the playback service that were available during the initial execution of the program, but may not be available at the time of playback.

In some implementations, the program to be recorded may be executed by a virtual machine. A virtual machine may be a software program that creates an environment that provides an abstraction of various resources of a physical computer system. The physical computer system may be referred to as a host machine and may have a host operating system. The host operating system may implement a virtual machine monitor, referred to as a hypervisor, to handle provisioning of resources and management of the virtual machine. The hypervisor may initialize the virtual machines and provide resources of the host machine to the virtual machines.

In some implementations, the program to be recorded may be executed by a Java virtual machine. A Java virtual machine may be initiated to run a particular Java application. A Java virtual machine is an execution environment for a Java application. For example, it may include components to interpret the bytecode of a Java application to execute the application. The Java virtual machine may translate the bytecode to binary instructions for implementation on the hardware on which the Java virtual machine runs. The execution recorder may begin recording the operations of a Java application by a Java virtual machine in response to the beginning of the Java application's execution. The execution recorder may generate a file based on the operations of the source code that are called by the Java application during the applications execution. In addition to Java virtual machines, the execution recorder described herein may be implemented to record execution of other virtual machines running particular programs for debugging purposes.

In some implementations, an execution recorder may be executed by a virtual machine. For example, the execution recorder may be executed by one virtual machine and a program for debugging may be executed by a second virtual machine. The virtual machine executing the execution recorder may communicate with the virtual machine executing the program for debugging. The communications may provide data regarding execution and performance of the program for debugging. In some implementations, a virtual machine may execute the execution recorder and the program for debugging.

As discussed above, an execution recorder may include a recorder service, a playback service, and a data provider service. The recorder service of the execution recorder may record the execution of a program for debugging. The recorder service may receive a notification or indication of instructions executed by the program through an interface with an execution engine of the virtual machine. For example, a virtual machine executing a program may generate the notification as instructions are executed. The virtual machine may then provide a notification of instructions performed during execution of the program. In instruction may be identified in the notification by an instruction identifier. In some implementations, the instruction identifier may include an indication of a source code statement associated with the executed instructions. For example, a virtual machine executing a program may have access to instructions that are stored with an indication of associated source code. The indication of associated source code may include an indication of a source code file, an indication of a method or function the source code file, and an indication, such as a line number, of a particular source code statement. The execution engine may use the indication of the associated source code statement to correlate the executed instructions to corresponding source code statements. For instance, a source code statement may be correlated with instructions generated by compiling that source code statement.

In some implementations, a virtual machine may generate a notification in response to each instruction executed for the program or for a set of instructions executed for the program. The notification may include an instruction identifier identifying the instruction that was executed and an indication of source code that is associated with the instruction. For example, the notification may include a reference to a line of source code, to a particular source code statement, or another indication of the source code statement associated with the instruction. In some implementations, the instructions may be binary instructions executed by a virtual processor of a virtual machine. The instructions may also be bytecode instructions executed by the virtual machine. For example, the instructions may be Java bytecode instructions executed by the execution engine of a Java virtual machine. The notification may be sent to the execution recorder through an interface with the virtual machine. For example, the virtual machine may provide the notification to the execution recorder through a socket, pipe, shared memory, or temporary file. In some implementations, the execution recorder may receive the notification through a virtual network interface. The notification may be a packet of data comprising a header and data indicating the executed instructions. In some implementations, the notification may be a bit stream provided by the virtual machine executing the program.

In some implementations, the recorder service may monitor the interface to identify executed instructions. In some implementations, the interface may be monitored periodically. In some implementations, the notifications may be sent over the interface in real-time as the instructions are executed by the virtual machine, however, they may also be sent periodically or in batches based on the implementation. In some implementations, the notification may be a data structure that stores instructions performed by the virtual machine. The notification may include the instructions executed with an associated timestamp. In some implementations, the notification may also include a thread identifier, arguments, or other information associated with the execution of the instructions.

In some implementations, the recorder service may identify one or more source code statements corresponding to the executed instructions based on the received notification. For example, the recorder service may access a source code file to identify a source code statement at a line indicated by an instruction identifier in the notification. The notification from the virtual machine may also include an argument that was used by the executed instructions. An argument may be a data value used by an executed instruction. Some arguments may include a value for a variable that is used during execution of the instruction. Some arguments may reference a memory location to retrieve a data value for use by the program. For example, the argument may reference a location in a database to retrieve an element from the database.

The notification may also include a timestamp indicating the value of the real-time clock identifying the moment in time at which the instructions were executed. In some implementations, the timestamp may indicate a time value other than the real-time clock. In some implementations, the timestamp may represent a value of a counter of the virtual machine or a clock of the virtual machine that is not directly correlated with the real-time clock. For example, the virtual machine may execute instructions for the executed program in a different timescale or with pauses when executing the program for debugging purposes. Accordingly, the timestamp associated with an executed instruction may not be associated with a real-time clock. Rather, the timestamp may indicate an order in which instructions were executed, but not associated directly with a real-time clock In some implementations, the notification may include a thread identifier to identify a thread associated with the executed instructions. The recorder service may record the thread in the execution record. This may enable the playback service to perform the operations of multiple threads in the same order as during the recorded execution. In some implementations, the recorder service may record the execution of separate threads as different files. In some implementations, the recorder service may record the execution of separate threads in one file and include thread identifiers indicating with which thread individual source code statements are associated.

In some implementations, the notification may also include output values generated during program execution. The recorder service may record output values in the execution record with the executed instructions. An output values may be a data element generated or returned by an instruction when it is executed. The recorded output value may be used during replay of the program execution to verify that the replay accurately performed the same instructions in the same manner as the recorded execution. For example, if the instructions did not execute in the same order during replay, the output value during replay may be different than the recorded output value. An error may be generated by the execution recorder in response to determining that an output value during replay is different than a corresponding recorded output value.

The playback service may use the execution record generated by the recorder service to replay the original execution of the program in order to recreate any errors that may have occurred. The playback service may execute one instruction in the execution record at a time based on the timestamp associated with each instruction. Accordingly, the playback service may execute instructions in a chronological order specified by the timestamps associated with each instruction. The timestamp may be used by the playback service to execute an instruction at a time of the playback corresponding to the time the instruction was executed in the recorded execution. For example, the execution during playback may be performed faster or slower than during the recorded execution. A playback clock may be started with a time that is the same as the start time of the recorded execution. However, the playback clock may run at a faster or slower rate than a clock used during the recorded execution. The playback service may execute a next instruction, identified by the next timestamp, at a time when the playback clock is the same as the next timestamp.

In some implementations, the execution record may include a record of the execution of multiple threads. To playback instructions from multiple threads, the next instructions to perform may be identified from the execution record based on the timestamp associated with source code statements. During playback the playback service may execute the instructions associated with a thread using a corresponding playback thread. Each thread recorded from the original execution may have a corresponding playback thread to execute instructions during the playback. Thus, if the playback is executing instructions for a first thread, but the next timestamp in the first thread indicates a later time than a timestamp for an instruction in a second thread, the playback service may pause the first thread to begin executing instructions for the second thread. For instance, the playback service may execute several instructions for a first execution thread before pausing the thread to execute instructions from another thread based on the timestamps associated with the source code instructions of each thread. To determine the next instruction to execute, the playback service may inspect each recorded thread to identify a next instruction to execute for each thread. The timestamps of the identified instructions may then be compared to determine which has the next timestamp. The playback recorder may then select the instruction with the next timestamp to execute. To execute a particular instruction during playback, the playback service may call the particular instruction and inject any arguments that are provided by the execution record into the instruction at the time of execution.

The playback service may further confirm that execution of the program during playback provides the same output values as during original execution. For example, in some implementations, the recorder service may record input values and output values of source codes statements executed by the program. The playback service may then compare the output values generated during playback to the output values generated during the original program execution. The output values generated during playback are generally expected to be the same as the output values generated during the original program execution if the instructions were performed during replay in the same order using the same data values of arguments. If the compared output values are not the same, the playback service may generate an error indicating that the recording or playback did not produce an output value that same as during the recorded execution.

The data provider service may provide data to the playback service that is not available from the original source during playback. For example, a database accessed during the original program execution may not be available at the time of playback. The recorder service may record the data used during execution to a data structure that is accessible to the data provider service. For example, the execution record generated by the recorder service may store arguments used by source code statements. Some arguments may reference a memory location that is not available at the time of replay. Accordingly, the recorder service may also store the data value from the memory location to a database. The data provider service may then use the database to return values referenced by the argument during the recorded execution. If the playback service has access to the databases or other data that was used by the program during execution, the data provider service may not be used. However, the data provider service may be used if the playback is performed without access to the same data. For instance, the data provider service may be used if a database has been modified since the time of the recorded execution. The data provider service may then provide a data value indicated by the argument to the playback service. In some implementations, the recorder service may also record the data value for the argument with a timestamp indicating when the instruction using the argument was executed.

In some implementations, the data provider service may communicate with the playback service over an HTTP interface. For example, the data provider service may receive an incoming request from the playback service over an HTTP interface and generate an HTTP reply containing the data. The playback service may generate the HTTP request to include an argument referencing a memory location or data structure to which the playback service does not have access. For instance, the request may include a memory location called by an instruction during playback. The data provider service may then identify a data value that is associated with the argument. The data provider service may then return the identified data value to the playback service in an HTTP reply. In some implementations, an argument may reference a memory location that was modified during execution of the program. The data provider service may use a timestamp associated with a stored data value to return the correct data value for a requested data value. For example, the request to the data provider service may also include a timestamp indicating when an executed instruction used the data requested from the data provider service. The data provider service may use timestamp to differentiate between different data values for a requested memory location. For example, the data provider service may return a data value that has the same timestamp as the next instruction to execute. In some implementations, the data provider service may function as an input stream to the playback service. For example, the data provider service may return the data in the order it was originally recorded to the playback service during playback. Accordingly, the instructions may consume the data from the data provider service input stream in the same order as recorded.

Below is an example program that may have its execution recorded through the execution recorder described herein. The program sums numbers received when the program is called. The recorder service may be initiated when the program is called to record the executed instructions of the program. Furthermore, the data provider service may record the values input to the program for later use by the playback service.

```
1: package org.jboss.math;
2:
3: public class Math {
4:
5: public static int sum(int . . . numbers){
6: int sum=0;
7: for (int n:numbers){
8: sum+=n;
9:}
10: return sum;
```

```
11:}
12:
13: public static void main(String . . . args){
14: Math sum(1,2,3,4);
15:}
16:}
```

In some implementations, the recorder service may record the execution of the program in an extensible markup language (XML) file. The XML file may indicate the source code statements that are executed in order, the thread that the source code statements are associated with, timestamps for the executed source code statements, and input values or references used by the source code statements. An example of an XML file that is generated by the recorder service during execution of the example program is shown below. As can be seen, the execution of a single thread is recorded by the recorder service. In some implementations of recording for other programs, additional threads may be generated by the program and may be recorded by the recorder service. The threads may be recorded in the execution record by a thread identifier associated with the recorded executed instructions. Furthermore, in other implementations the format recorded in the XML file may be different or may include fewer or additional elements. In some implementations, another type of file, such as a Javascript object notation (JSON) file may be used instead of an XML file to store the recording of the program execution.

In the example XML file below, the first tag "<Execution>" represents the beginning of the recorded execution. The next tag "<Thread_1>" represents the beginning of a first thread in the recorded execution. Additional threads may be identified in the execution record to identify source code statements associated with the threads. Following the beginning of the recorded execution and first thread, the XML file records the lines of source code statements that are executed. The XML file may record attributes for the line executed in a particular class and an associated timestamp. For instance, the third line of the XML file below indicates a next executed line of source code. It states: "<exec line="13" class="org.jboss.math.Main" timestamp="2015-02-08 T 10:44:58 UTC">." This indicates that line 13 of the org.jboss.math.Main class was executed at time 2015-02-08 T 10:44:58 UTC. From the source code file above, it can be seen that the associated source code statement is "public static void main(String . . . args)." Additional execution lines may be formatted similarly to indicate the line executed, the class where the line is executed is located, and a timestamp. Following identification of an executed source code statement, the next lines of the XML file indicate elements of the execution of the source code statement. For instance, a method executed by the source code statement is identified the method main(String[ ]) by "<method ref="main (String[ ])">." The argument called by the method during execution of the source code statement are further identified as name="args", type="String[ ]", and value="[ ]" by the XML line "<argument name="args" type="String[ ]" value="[ ]">." The next lines of the file record the end of the record of executing line 13 of the source code. The remaining lines of the XML file shown below record the execution of additional source code statements. For instance, the execution record shown below shows the record of execution of lines 14, 6, 8, and 10 of the source code. The additional components of the XML file may indicate methods, arguments, or assignments for each source code statement executed.

```
<Execution>
<Thread_1>
<exec line="13" class="org.jboss.math.Main" timestamp="2015-02-08 T 10:44:58 UTC">
<call>
<method ref="main(String[ ])">
<argument name="args" type=" String [ ]" value="[ ]">
</method>
</call>
</exec>
<exec line="14" class="org.jboss.math.Main" timestamp="2015-02-08 T 10:45:01 UTC">
<call>
<method ref="sum(int[ ])">
<argument name="numbers" type="int[ ]" value="[1.2.3.4]">
</method>
</call>
</exec>
<exec line="6" class="org.jboss.math.Main" timestamp="2015-02-08 T 10:45:02 UTC">
<assign>
<field ref="sum" value="0"/>
</assign>
</exec>
....
<exec line="8" class="org.jboss.math.Main" timestamp="2015-02-08 T 10:45:07 UTC">
<assign>
<field ref="sum" value="${sum} + ${n}"/>
</assign>
</exec>
<exec line="10" class="org.jboss.math.Main" timestamp="2015-02-08 T 10:45:09 UTC">
<return value="${sum}/>
</exec>
<Thread_1/>
<Execution/>
```

Although aspects of the present disclosure may be particularly useful with certain types of applications or virtual machines, the systems disclosed herein may be used with other types of devices (both physical and virtual), or other resources. For example, aspects of the present disclosure may relate to other application programming environments or may use different features than those disclosed.

Figure 1:
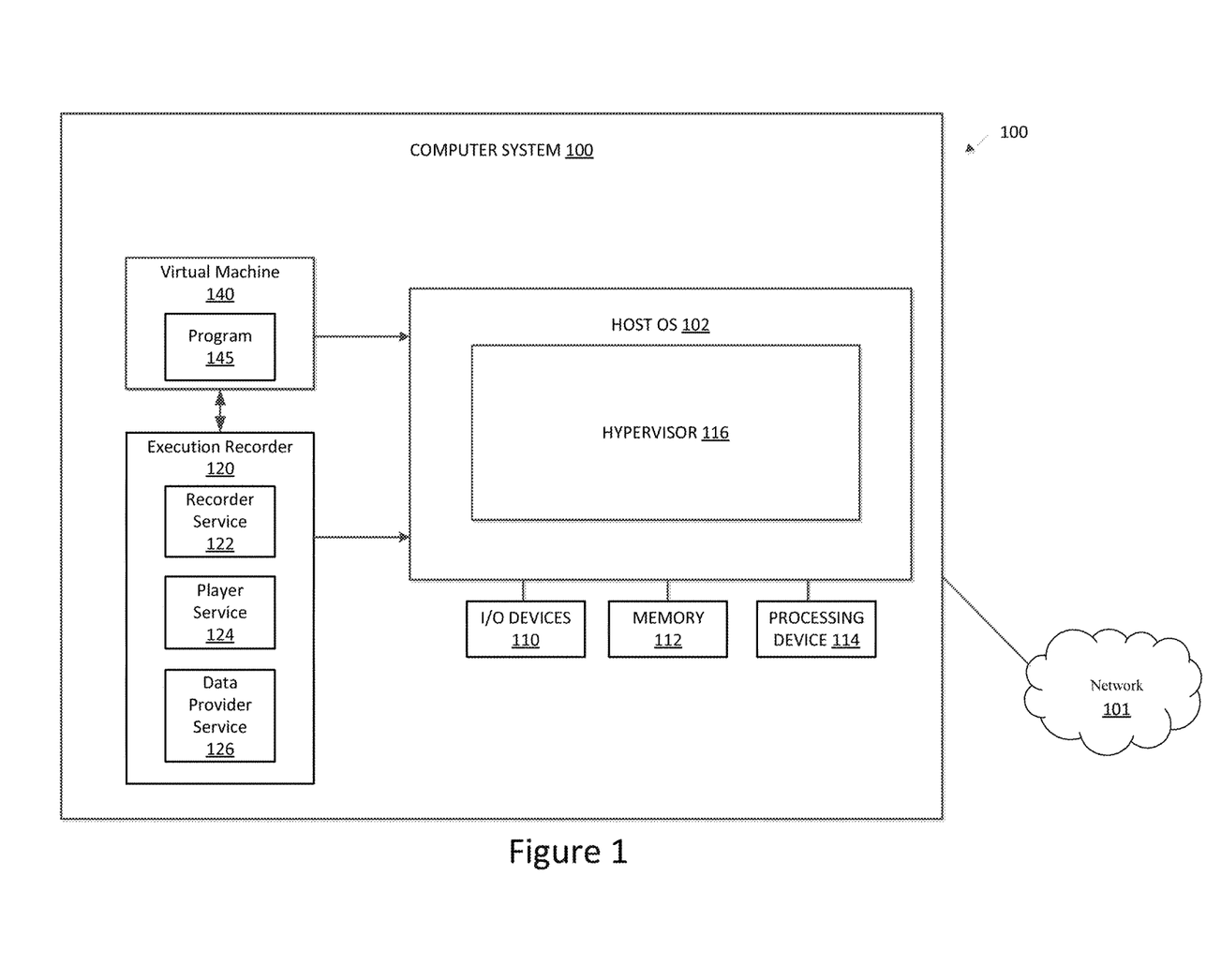
FIG. 1 is a block diagram of a system for recording execution of a program on a virtual machine in accordance with one or more aspects of the present disclosure.

FIG. 1 depicts a block diagram of an exemplary computer system 100 for recording and playing back execution of a program that may be used to implement one or more aspects of the present disclosure. The computer system 100 may be a server, a mainframe, a workstation, a personal computer (PC), a mobile phone, a portable computing device, etc. Implementations of the system 100 may also be implemented in a cloud system. As shown, the computer system 100 may be coupled to a network 101. The network 101 may be a private network (e.g., a local area network (LAN), a wide area network (WAN), intranet, etc.) or a public network (e.g., the Internet). Computer system 100 may run host software or kernel, such as host operating system 102, that manages the hardware resources of the computer system 100 and that provides functions such as inter-process communication, scheduling, memory management, and so forth. In some implementations, the host operating system 102 may also include a hypervisor 116, which may be software that provides a virtual operating platform for a virtual machine 140, and manages the execution of the virtual machine 140. The computer system 100 may also include an execution recorder 120 to record execution of an application by the virtual machine 140. The execution recorder 120 may be executed by a virtual machine controller by hypervisor 116. In some implementations, the execution recorder 120 may be executed as a program of the host operation system 102.

The hypervisor 116 may take various forms. For example, the hypervisor 116 may be part of or incorporated in the host operating system 102 of computer system 100, or the hypervisor 116 may be running on top of the host operating system 102. Alternatively, the hypervisor 116 may be a "bare metal" hypervisor that runs on hardware of the computer system 100 without an intervening operating system. The hypervisor 116 manages system resources, including access to an I/O device 110, memory 112, processing device 114, and the like. The hypervisor 116, though typically implemented in software, may emulate and export a physical layer of computer system 100 to higher level software. Such higher level software may comprise a standard or real-time operating system (OS), may be a highly stripped down operating environment with limited operating system functionality, may not include traditional OS facilities, etc. The hypervisor 116 presents to other software (e.g., virtual machine 140 or the execution recorder 120) an abstraction of the physical layer that may provide the same or different abstractions to various guest software, such as guest operating system, guest applications, etc.). Some examples of hypervisors include quick emulator (QEMU®), kernel mode virtual machine (KVM®), virtual machine monitor (VMM), etc.

The hypervisor 116 may support a virtual machine 140 residing on the computer system 100. In some implementations, more than one virtual machine may reside on the computer system 100. For example execution recorder 120 may be implemented as part of a virtual machine. The virtual machine 140 may be a software implementation of a machine that executes programs as though the virtual machine 140 was a physical machine. In some implementations, the virtual machine 140 may be a Java virtual machine and may operate without a hypervisor 116 controlling it in the host operating system. The hypervisor 116 can either handle requests by the virtual machine 140 for machine resources, or forward the request to the host OS 102.

The computer system 100 may include I/O devices 110, a memory 112, and a processing device 114. I/O devices 110 may refer to devices capable of providing an interface between a processor and an external device capable of inputting and/or outputting binary data. A memory 112 may refer to a volatile or non-volatile memory device, such as RAM, ROM, EEPROM, or any other device capable of storing data. A processing device 114 may refer to a device capable of executing instructions encoding arithmetic, logical, or I/O operations. In one illustrative example, a processor may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions or multiple threads. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). Although, for simplicity, a single processor 114 is depicted in FIG. 1, in some other implementations the computer system 100 may comprise a plurality of processors. Similarly, in some other implementations the computer system 100 may comprise a plurality of I/O devices, rather than a single I/O device 110, and a plurality of memory devices rather than a single memory device 112.

Figure 2:
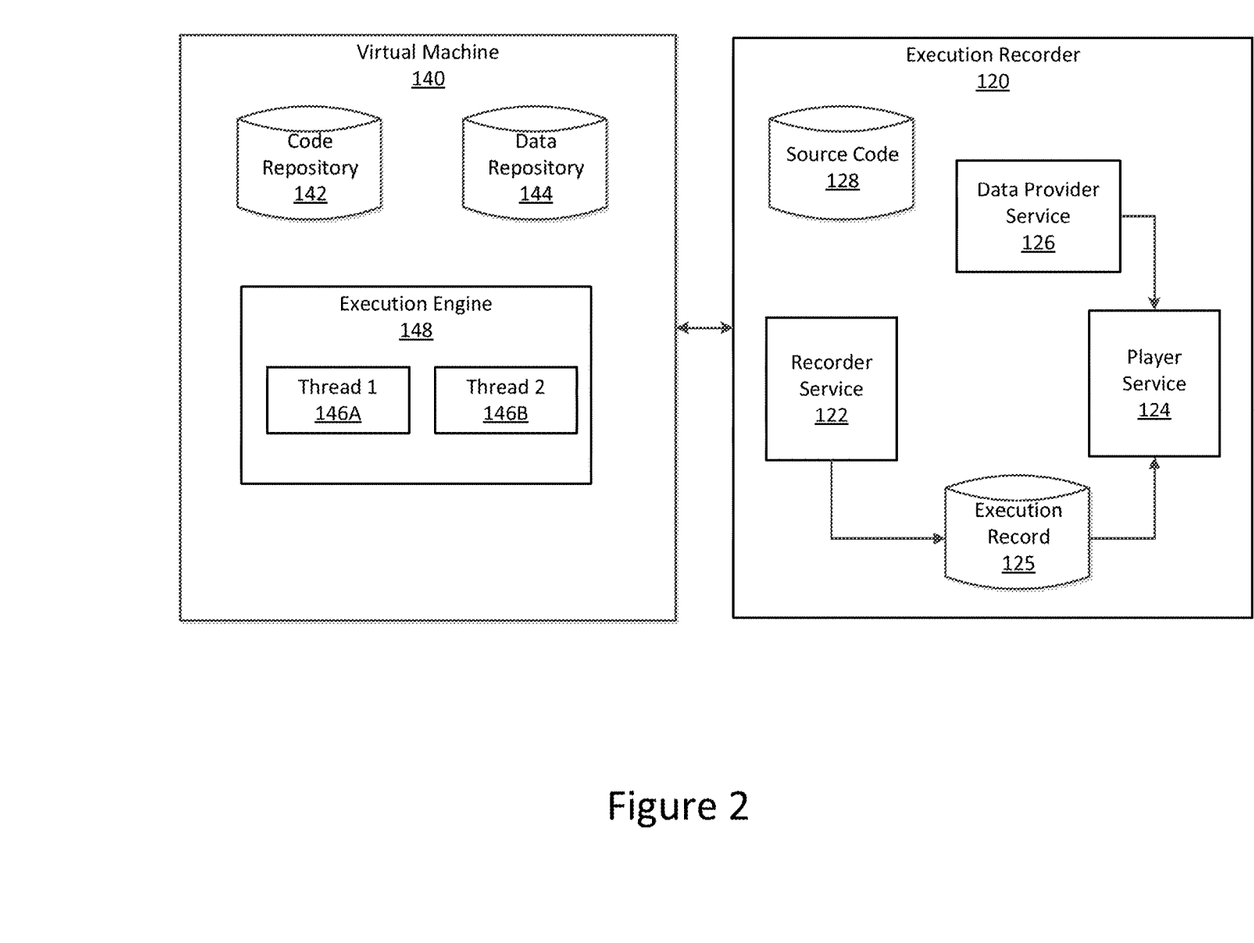
FIG. 2 is a block diagram of a system for recording execution of a program on a virtual machine in accordance with one or more aspects of the present disclosure.

FIG. 2 depicts a block diagram of components of a computer system to record and playback execution of an application that may be used to implement one or more aspects of the present disclosure. As discussed above, the execution recorder 120 may include a recorder service 122, a player service 124, and a data provider service 126. The execution recorder 120 may monitor the execution of a program on virtual machine 140. For example, the virtual machine 140 may be a Java virtual machine that executes a Java application. In some implementations, the execution recorder may be executed by a virtual machine different than the virtual machine 140 that executes the program to be recorded.

The virtual machine 140 may include a code repository 142. The code repository may include compiled code that provides instructions for executing a program. The virtual machine 140 may also include a data repository 144 that includes data for execution of the program. In some implementations, the code repository 142 or the data repository 144 may also include a source code file associated with the program to execute. In some implementations, the data repository 144 may be stored separately from the virtual machine 140 or the virtual machine 140 may have access to additional repositories on other systems. For example, the data repository 144 may be stored in computer memory that is not allocated to the virtual machine 140. In some implementations, the code repository 142 may reside in memory allocated to execution recorder 120, or a copy of the code repository 142 may be accessible to the execution recorder 120.

The virtual machine 140 may further include an execution engine 148 that executes instructions for the virtual machine. For example, the execution engine may use instructions provided by code repository 142 to provide execution instructions to a host computer system that executes the virtual machine 140. As shown in FIG. 2, the execution engine 148 may execute multiple threads 146A, 146B of the executing program at one time. The threads 146A, 146B may be executed in series or parallel with each other. For example, thread 1 146A may consume some execution resources of execution engine 148 and thread 2 146B may consume additional execution resources of execution engine 148. The execution engine 148, or an operating system of the virtual machine 140, may determine scheduling of thread 1 146A and thread 2 146B for consuming the shared resources.

During execution of the program by virtual machine 140, the execution engine 148 may provide data regarding the program execution to the execution recorder 120. For example, the virtual machine 140 may provide an interface through which the execution recorder 120 may receive a notification of the instruction that is being executed or has been executed for the program. The execution recorder 120 may further receive the arguments or data values that are used or generated during execution of the instruction. The recorder service 122 may then record the data in a format for use by the player service 124. For example, for an executed instruction, the recorder service 122 may record an associated source code statement that is executed, arguments that are used by the source code statement, and a timestamp associated with the execution time of the instruction. The source code statement may be identified based on an indication of the source code associated with the executed instructions in the notification. In some implementations, the source code statement may be identified based on stored correlations between the executing instructions and source code statements. For example, a notification provided by the virtual machine may include an executed instruction and an indication of a line of source code associated with the executed instruction. The execution recorder may use the notification to identify a source code statement associated with the executed instructions. For example, the recorder service may identify in a source code file 128 a source code value associated with the instruction. In some implementations, the notification may include a class and line associated with an executed instruction. Accordingly, the recorder service 122 may identify a source code statement at a line in a class indicated by the notification.

In some implementations, the source code statement that is executed may be recorded as the class that is being executed, a location (such as a line in the source code) in the class that is executed, arguments or data values that are used during execution, and a timestamp associated with execution time of the instruction in a database. For example, an execution record 125 may be stored in memory for later use by the player service 124. In some implementations, the execution record may be stored as an XML file or another file type that allows the player service 126 to access and interpret the execution record 125. In some implementations, the recorder service 124 may reference the source code file 128 of the program to record source code statements that are performed during execution of an instruction. Therefore, the recorder service 122 may record the execution of the program at the source code level instead of execution of instruction from code repository 142.

In some implementations where the program is a Java application running on a java virtual machine, the execution data provided to the recorder service 122 may be provided through a Java debug wire protocol (JDWP) interface. The JDWP is a format for information to pass between the execution engine 148 of the virtual machine 140 to the execution recorder 120. In some implementations, the execution recorder 122 may request information from the virtual machine 140 over the same channel. In some implementations, the interface between the virtual machine 140 and the execution recorder 120 may be implemented with virtual network interfaces, sockets, pipes, shared memory, or other communication mechanisms. In some implementations, the virtual machine 140 and the execution recorder 120 may be implemented on remote computer systems and may communicate over physical network elements. In addition to the execution record 125, data used during execution of the program may be provided to the data provider service 126 to store for use when providing data to player service 124. In some implementations, the data may be stored in a database with the execution record 125.

After recording the execution of a program, the execution recorder 120 may replay the program using a player service 124. The player service 124 may interpret the execution record 125 to replay the previously recorded execution. For example, the player service 124 may step through the lines of the execution record to execute individual instructions of the program in the order recorded and using the recorded data values. In the example program described above, the execution record 125 includes the following XML data:

```
<exec line="6" class="org.jboss.math.Main" timestamp="2015-02-08 T 10:45:02 UTC">
<assign>
<field ref="sum" value="0"/>
</assign>
</exec>
```

The player service 124 may interpret the first line of the XML file to determine a class and a line of the class to execute. The player service 124 may then execute an instruction to assign the value of "0" to the field "sum," as instructed by the execution record 125. The player service 124 may continue to step through the file in order based on the provided timestamps. For example, the player service 124 may stop the execution associated with thread 1 146A on the playback if the timestamps indicate that thread 2 146B began executing instructions next while stepping through lines of the execution record during the playback.

The player service 124 may execute the program based on the execution record 125 on the virtual machine 140 or on another virtual machine associated with the execution recorder 126. For example, the player service 124 may playback the operation of the program in a controlled environment wherein each instruction of the execution may be performed as designated by the player service 124. In some implementations, the player service 124 may have an execution engine that executes and stores the commands as described in the execution record 125 on the execution recorder 120. To execute multiple threads in the same manner as they were executed during recording, the playback service 124 may execute each recorded thread with a corresponding replay thread during replay. For example, instructions associated with a first thread during the recorded execution may be executed with a corresponding first replay thread during playback by the playback service 124. Accordingly the replay threads may be paused and resumed by the playback service in the same order as during the recorded execution.

During playback, the player service 124 may determine that source code statement in a line of the execution record uses data that is not available to the player service 124 at the time of playback. For example, the virtual machine 140 may have had access to data repository 144 that is not accessible to the player service 124 during playback. The data provider service 126 may then provide the data to the player service 124. For example, the player service 124 may request the data from data provider service 126 instead of from the data repository 144 used during program execution. The data provider service 126 may then access a record of the data used during execution to provide the same data to the player service 124 during playback. For example, the data provider service 126 may include a list of values used during execution and provide those values to the player service 124 based on an associated timestamp or data reference requested by the original execution. For example, a data value in the data provider service 126 may be provided to the player service 124 if the executed instruction of the playback service 124 has the same timestamp as a timestamp associated with the data value. In some implementations, the data provider service 126 may record the values received at the execution engine 148 based on a call to a data repository 144. Then, the data provider service 126 may provide the same values to the player service 124 in response to a call to the data provider service 126 for the same data that was requested from the data repository 144 during the recorded execution.

Figure 3:
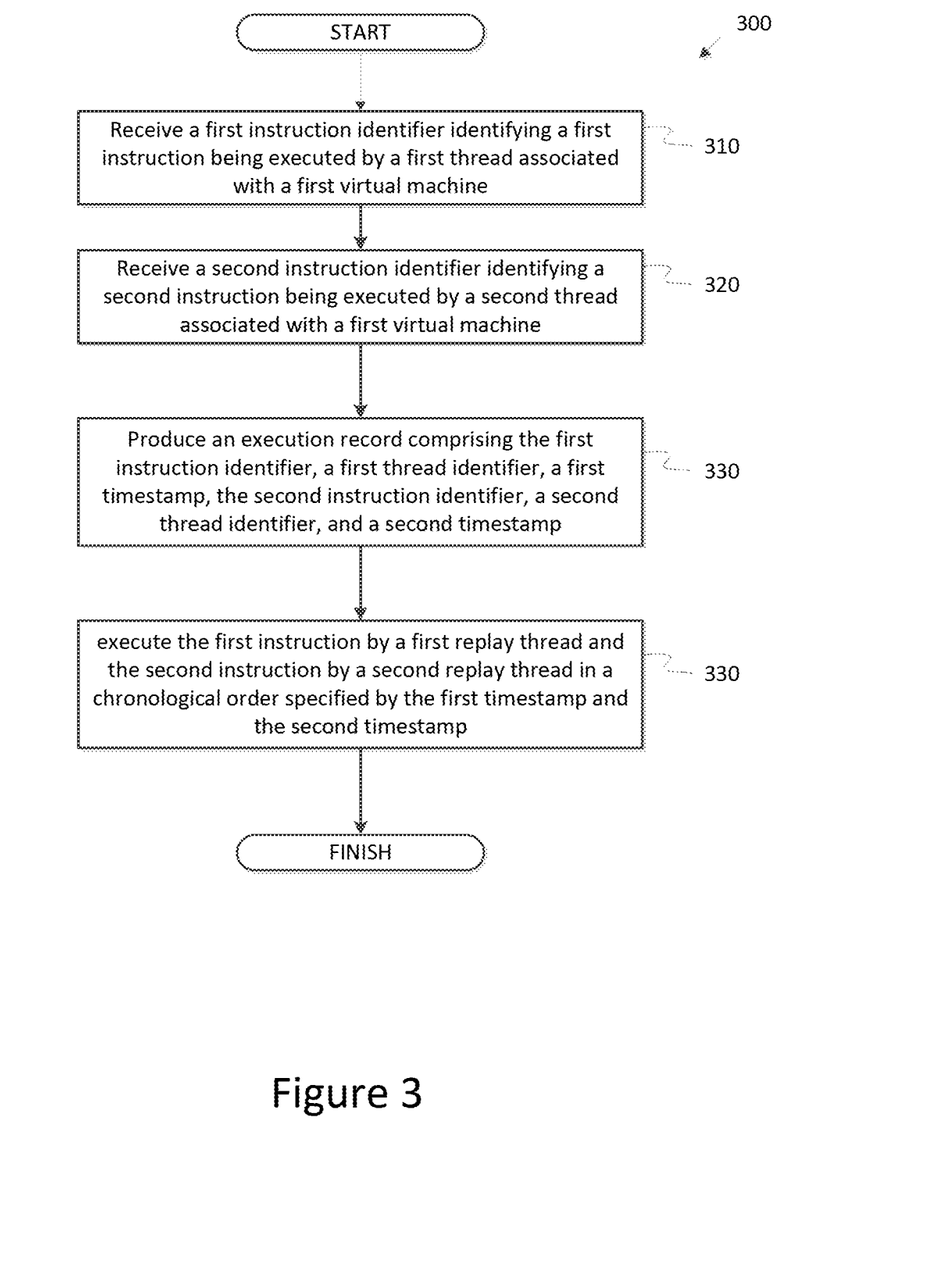
FIG. 3 is a flow diagram of a method for recording execution of a program on a virtual machine in accordance with one or more aspects of the present disclosure.

FIG. 3 is a flowchart illustrating a method 300 performed by an execution recorder to record the execution of a program, according to an implementation. Beginning in block 310, the execution recorder receives a first instruction identifier identifying a first instruction being executed by a first thread associated with a first virtual machine. For example, the instruction identifier may be received in a notification from the virtual machine as discussed above. In some implementations, the identifier may include an executed instruction, a timestamp associated with the time the instruction was executed, and a thread identifier identifying the first thread. In some implementations, the execution recorder may receive the first instruction identifier after receiving an identifier of a program to execute. For example, the identifier of the program to be executed by a virtual machine may include a program name, file location, or other identifier of the program. The identifier may be provided to indicate that the virtual machine will begin to execute the program. The identifier may also include a file location for a source code file associated with the program. In some implementations, the execution recorder may initiate the execution of the program by the virtual machine. For example, the execution recorder may receive an instruction to record a program identified by the identifier on a virtual machine and then initiate the execution of the program on the virtual machine.

In block 320, the execution recorder receives a second instruction identifier identifying a second instruction being executed by a second thread associated with the first virtual machine. For example, the second instruction identifier may be received in a notification from the virtual machine as discussed above. In some implementations, the identifier may include an executed instruction, a second timestamp associated with the time the second instruction was executed, and a second thread identifier identifying the second thread.

In some implementations, the instruction identifiers received in blocks 310 and 320 may include arguments used by the execution of the instructions, output value generated by the instructions, a timestamp associated with the time of execution of the instruction, thread identifiers for the instructions, or other information related to the execution of the first and second instruction. In some implementations, the first or second instruction identifier may include an indication of a source code statement of the executing program such as a line of the source code associated with the executed instruction.

In block 330, the execution recorder produces an execution record identifying the first executed instruction, a thread identifier identifying the first thread, a first timestamp reflecting a first real-time clock value associated with executing the first instruction, the second instruction identifier, a second thread identifier identifying the second thread, and a second timestamp reflecting a second real-time clock value associated with executing the second instruction. In some implementations, the execution recorder may record the executed instructions as a source code statement corresponding to the executed instructions. The source code statements may be recorded with an indication of the order of execution, such as a timestamp, in order to recreate the execution during playback. In some implementations, the recorder service may include an indication of the thread associated with the recorded source code statements. Recording a thread identifier associated with the source code statements may enable the playback to accurately pause and resume threads during execution in the same manner as during the original execution. In some implementations, one or more data values used by the executed instructions may be recorded with the corresponding source code statements.

The processes described with reference to blocks 310, 320, and 330, may be performed by the execution recorder continuously as the program is executed by the virtual machine. The program may stop when the execution returns an error or execution completes. The execution recorder may receive a notification that indicates the program has stopped execution. The execution recorder may then store the generated execution record and associated files to a memory location accessible to the playback recorder.

In block 340, the execution recorder executes, using the execution record, the first instruction by a first replay thread of a second virtual machine and the second instruction by a second replay thread of the second virtual machine in a chronological order specified by the first timestamp and the second timestamp. For example, the first instruction may be executed by a first replay thread before the second instruction is executed by the second thread in response to determining that the first timestamp reflects and earlier execution time than the second timestamp.

Figure 4:
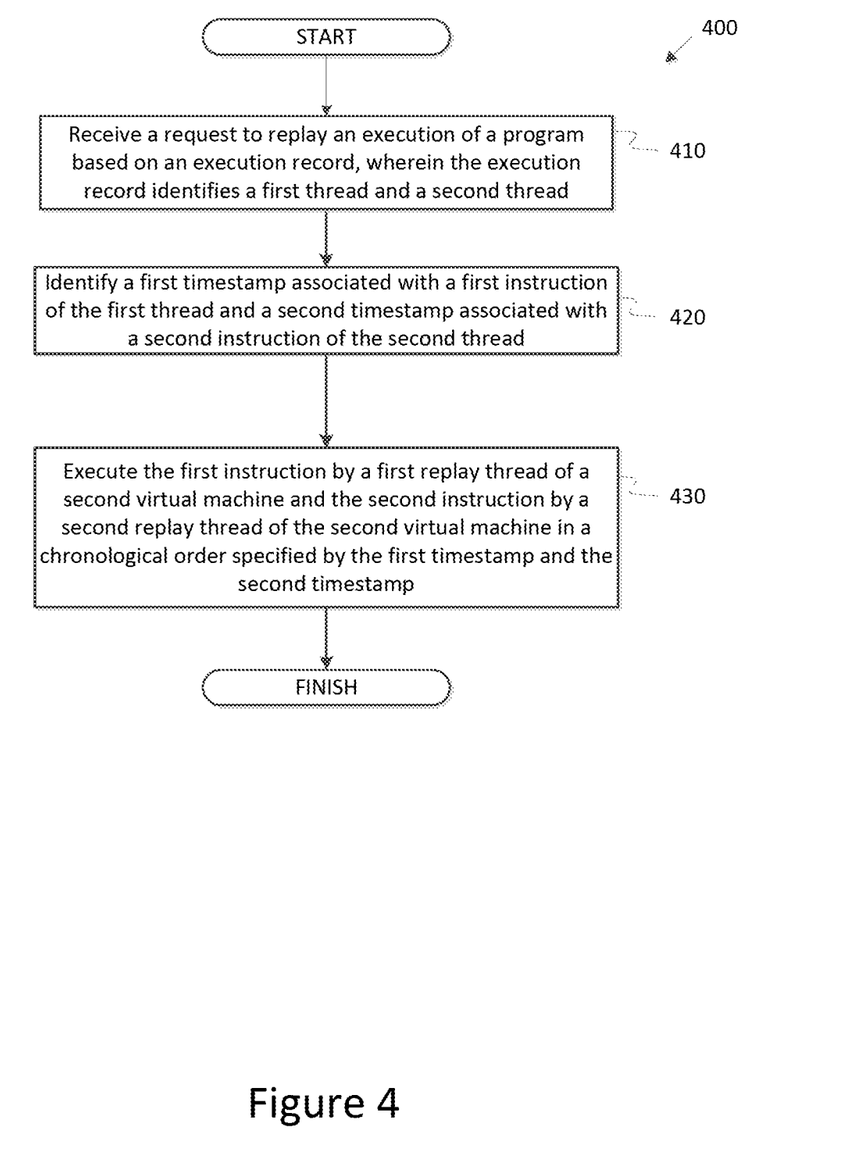
FIG. 4 is a flow diagram of a method for playing back a recording of an execution of a program in accordance with one or more aspects of the present disclosure.

FIG. 4 is a method 400 performed by an execution recorder to playback the execution of a program, according to an implementation. Beginning in block 410, the execution recorder may receive a request to replay an execution of a program based on an execution record, wherein the execution record identifies a first thread and a second thread. The threads may be identified by thread identifiers associated with one or more executed instructions. In some implementations, the instructions executed for a particular thread may be stored together in the execution record.

In block 420, the execution recorder identifies a first timestamp associated with a first instruction of the first thread and a second timestamp associated with a second instruction of a second thread. To identify a timestamp associated with a next instruction executed for a thread, the execution recorder may compare the time of a playback clock to the timestamps associated with a set of instructions associated with the thread. The timestamp that is next in time compared to a current time of a playback clock may be identified as the next timestamp for the thread. The execution recorder may identify a timestamp associated with a next instruction to execute for each recorded thread. In some implementations, the execution recorder may not identify a timestamp for a next instruction for threads that have completed execution.

In block 430, the execution recorder executes the first instruction by a first replay thread of a second virtual machine and the second instruction by a second replay thread of the second virtual machine in a chronological order specified by the first timestamp and the second timestamp. For example, the execution recorder may execute the first instruction of the first thread in response to determining that the first timestamp is earlier in time than the second timestamp. For example, after determining timestamps for the next instruction in the first thread and the second thread, the execution recorder may compare the timestamps to determine which timestamp is earlier in time. In some implementations, rather than comparing the timestamps, the execution recorder may execute the next instruction in response to determining that a time of the playback clock is the same as the timestamp for an executed instruction. In some implementations, there may be more than two threads. Accordingly, the processes described with respect to method 400 may be applied to additional threads. For instance, additional timestamps may be identified for additional threads. Furthermore, additional timestamps may be compared by the execution recorder to determine a next instruction to execute.

Figure 5:
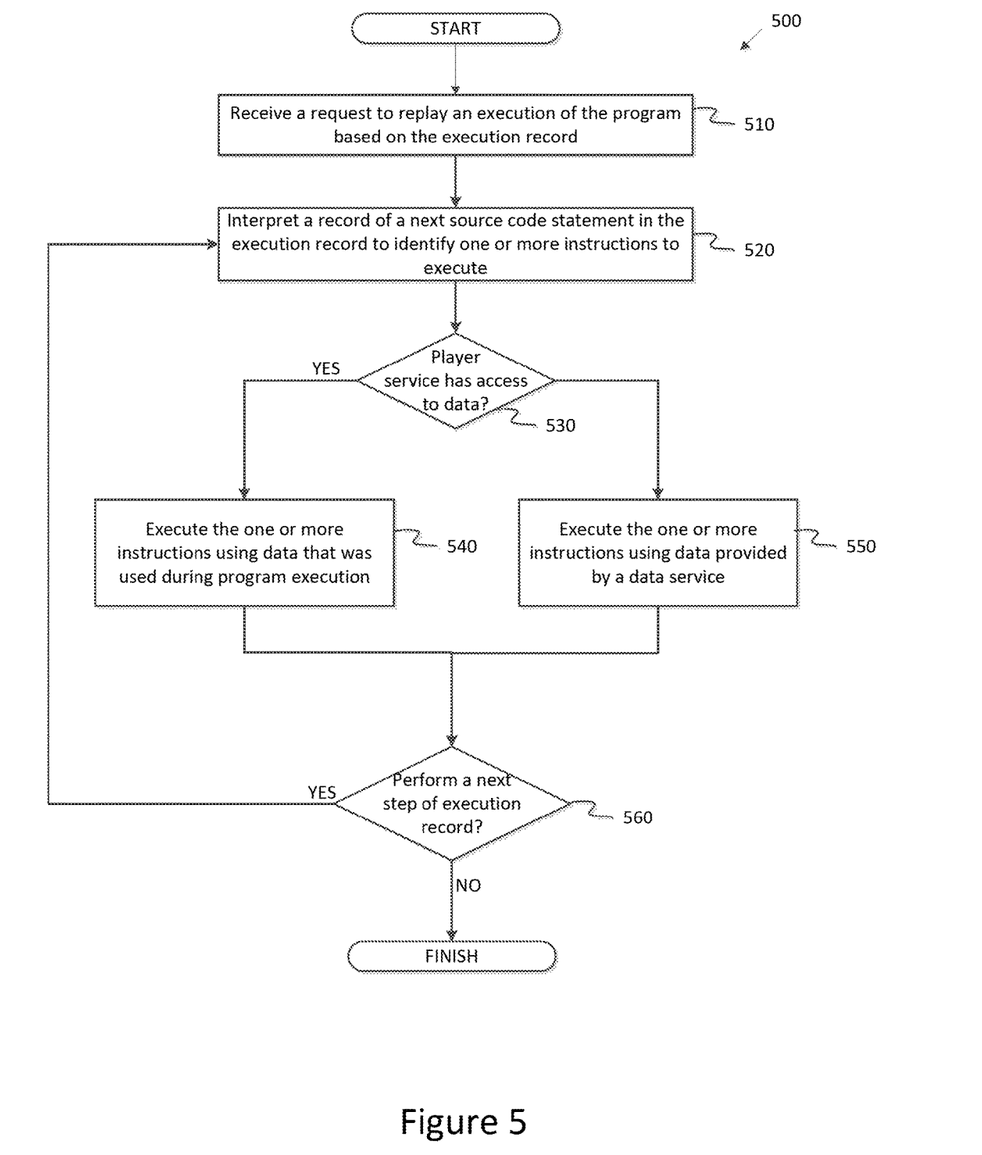
FIG. 5 is a flow diagram of a method for playing back a recording of an execution of a program in accordance with one or more aspects of the present disclosure.

FIG. 5 is a method 500 performed by an execution recorder to playback the execution of a program, according to an implementation. In block 510, the execution recorder receives a request to playback a program execution based on the execution record. For example, after an error in the program, the execution recorder may automatically receive a request to begin playback of the program to detect the error. In some implementations, the execution recorder may receive a request from a user device to playback the program. In some implementations, the indication may include a timestamp through which to perform playback. For example, the indication may include a timestamp a set amount of time before an error through which a player service should replay the program automatically.

In block 520, the execution recorder interprets a record of the next source code statement in the execution record to identify one or more instructions to execute. For example, an execution record may include a list of source code statements executed during the original execution of the program. The next source code statement may correspond to the next instructions executed during the original execution of the program. For example, the next source code statement may be identified by the next timestamp in the execution record or as next in an ordered set of source code statements. The recorded source code statement may include a value that is used by the program during execution. The instructions to execute during replay may be determined by the playback service based on the source code statement. For instance, the playback service may interpret the source code statement to determine instructions corresponding to the source code statement in a compiled program file. In some implementations, the playback service may access the source code file to identify the source code statement and identify one or more instructions to execute to replay the original execution. In some implementations, the execution record may have recorded multiple threads. The processes of identifying an instruction to execute may be similar to the method described above with reference to FIG. 4.

In block 530, the execution recorder determines whether the player service has access to one or more data elements used during program execution. For example, if the player service does not have access to a database that was used during the original execution, the execution recorder may determine that the player service does not have access to a data element in the database. If the player service does have access to the data, the method 500 may proceed to block 540, if the player service does not have access to the data, the method 500 may proceed to block 550.

In block 540, the execution recorder executes the one or more identified instructions in the recorded execution with data used during program execution. For example, the value may have been recorded to a database associated with the execution record or stored in the execution record with the source code statement. In some implementations, the data may be available from the same database as was available during the program's execution. In such cases, the database may be called using the same reference during playback. In order to playback the source code statement, the execution recorder may execute the identified instructions with an associated value to cause a processor to repeat the execution.

In block 550, the execution executes the one or more identified instructions using data provided by a data provider service. For example, if the original data element is not available during playback, it may be provided for playback execution by a data provider service based on data recorded by the execution recorder. In order to playback the source code statement, the execution recorder may execute the identified instructions with an associated data value from the data provider service to repeat the execution.

After executing identified instructions in block 540 or 550, the execution recorder may determine whether to execute instructions associated with a next source code statement of the execution record. For example, the playback of the execution record may pause in response to reaching a particular time, reaching an error, or to wait for an indication that the execution playback is to continue. For example, the playback may pause at a time indicated when beginning the playback, after each source code statement or a set number of source code statements, when changing threads, or at any other time indicated to the playback recorder. If the execution recorder is to perform the next source code statement of the execution record, the method may return to bock 520 to access the next source code statement and execute instructions corresponding the next source code statement. If the execution recorder is not to perform the next source code statement, or if there are no additional source code statements recorded, the method 500 may end or pause until an indication to perform a next source code statement is received.

Figure 6:
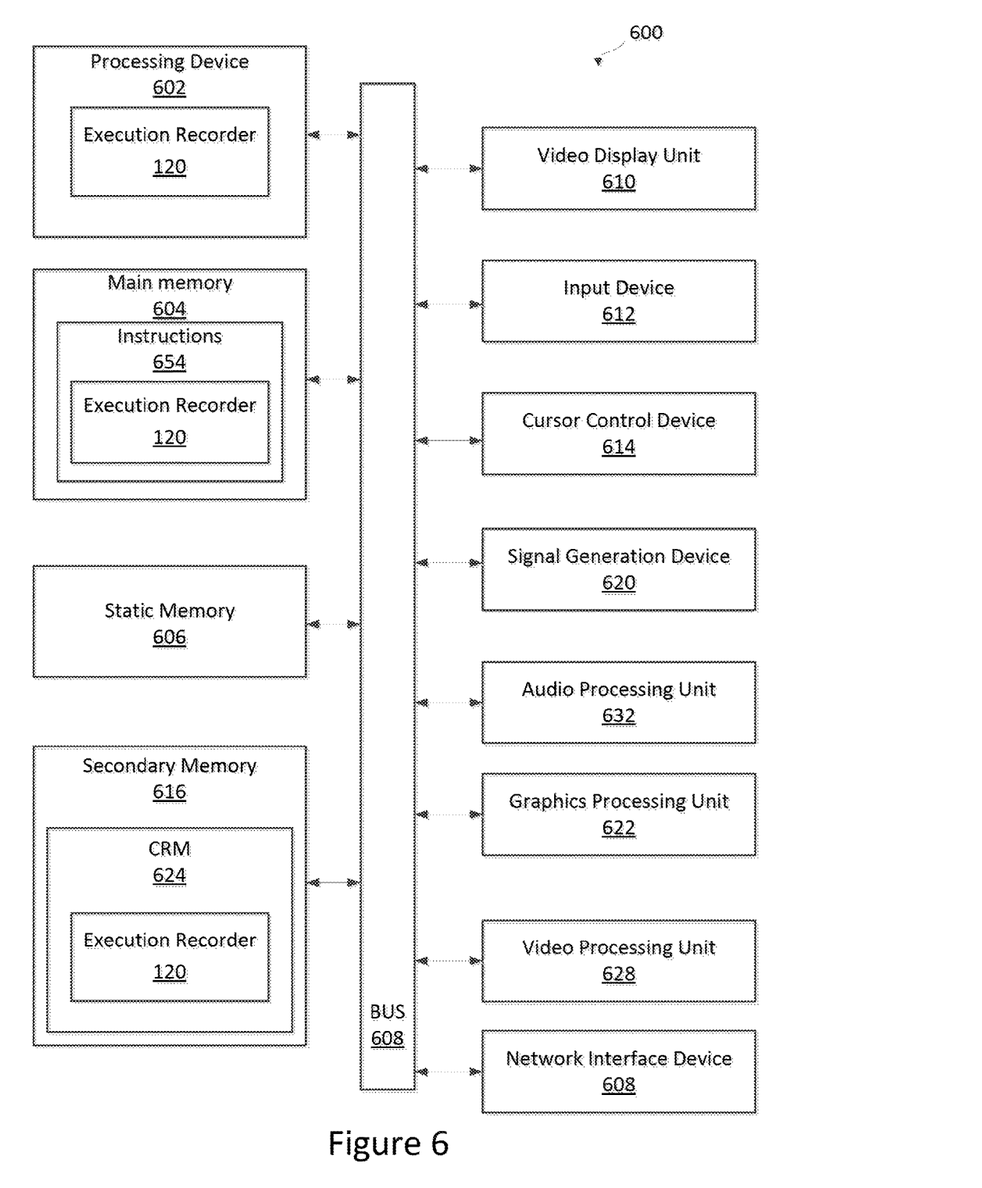
FIG. 6 is a block diagram of an example computer system operating in accordance with one or more aspects of the present disclosure.

FIG. 6 depicts an example computer system 600 which can perform any one or more of the methods described herein for recording and playing back the execution of a program. In one example, computer system 600 may correspond to computer system 100 of FIG. 1. The computer system may be connected (e.g., networked) to other computer systems in a LAN, an intranet, an extranet, or the Internet. The computer system 600 may operate in the capacity of a server in a client-server network environment. The computer system 600 may be a personal computer (PC), a set-top box (STB), a server, a network router, switch or bridge, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 600 includes a processing device 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a secondary memory 616 (e.g., a data storage device), which communicate with each other via a bus 608.

The processing device 602 represents one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core CPU (computer processing unit), a multi-core CPU and a massively multi-core system that includes many interconnected integrated circuits, each of which may include multiple processor cores. The processing device 602 may therefore include multiple processors. The processing device 602 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 602 may also be one or more special-purpose processing devices such as an application specific integrated circuit (ASIC), a field programmable gate array (FPGA), a digital signal processor (DSP), network processor, system on chip (SoC), or the like. The computer system 600 may include a graphics processing unit 622, a video processing unit 628, and an audio processing unit 632.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The secondary memory 616 may include a machine-readable storage medium (or more specifically a computer-readable storage medium (CRM)) 624 on which is stored one or more sets of instructions embodying any one or more of the methodologies or functions described herein (e.g., execution recorder 120). The main memory 604 may also store, completely or partially, instructions 654 embodying any one or more of the methodologies or functions described herein (e.g., execution recorder 120). Furthermore, the processing device 602 may include instructions to implement execution recorder 120 during execution thereof by the computer system 600. The main memory 604 and the processing device 602 may also include machine-readable storage media.

While the computer-readable storage medium 624 is shown in an exemplary implementation to be a single medium, the term "computer-readable storage medium" (or "computer-readable medium") should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine that cause the machine to perform any one or more of the methodologies of the present disclosure. The term "computer-readable storage medium" shall accordingly be taken to include, but not be limited to, non-transitory media such as solid-state memories, and optical and magnetic media.

Figure 7:
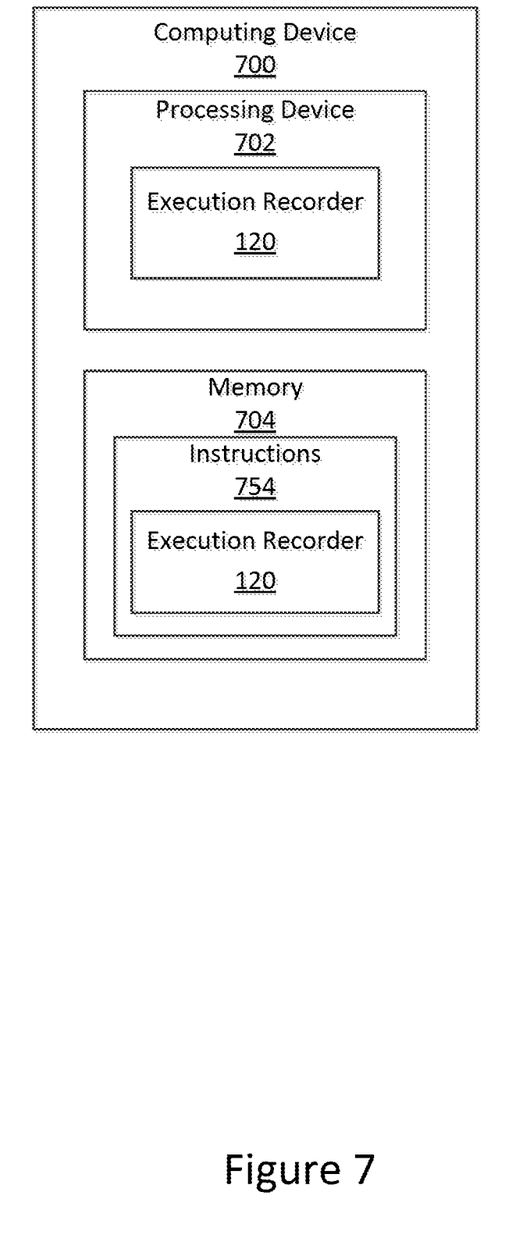
FIG. 7 is a block diagram of an example computer system operating in accordance with one or more aspects of the present disclosure.

FIG. 7 depicts an example computing device 700 which can perform one or more of the methods described herein for recording and playing back the execution of a program. In one example, computing device 700 may correspond to computer system 100 of FIG. 1. The computer system may be connected (e.g., networked) to other computer systems in a LAN, an intranet, an extranet, or the Internet. The computing device 700 may operate in the capacity of a server in a client-server network environment. The computing device 700 may be a personal computer (PC), a set-top box (STB), a server, a network router, switch or bridge, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computing device 700 includes a processing device 702 and a memory 704. The memory 704 may be a read-only memory (ROM), flash memory, dynamic random access memory (DRAM) such as synchronous DRAM (SDRAM), a static memory such as flash memory or static random access memory (SRAM)), or a secondary memory such as a data storage device. The processing device 702 and memory 704 may communicate with each other via a bus.

The processing device 702 represents one or more general-purpose processors such as a microprocessor, central processing unit, or the like. The processing device 702 may therefore include multiple processors. The processing device 702 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 702 may also be one or more special-purpose processing devices such as an application specific integrated circuit (ASIC), a field programmable gate array (FPGA), a digital signal processor (DSP), network processor, system on chip (SoC), or the like. In some implementations, the computing device 700 may include additional components. For example, the computing device 700 may include components as described above with reference to computer system 600.

The memory 704 may store, completely or partially, instructions 754 embodying any one or more of the methodologies or functions described herein (e.g., execution recorder 120). Furthermore, the processing device 702 may include instructions to implement execution recorder 120 during execution thereof by the computing device 700. For example, in some implementations, the processing device may receive a request to replay an execution of a program based on an execution record, wherein the execution record identifies a first thread and a second thread and wherein the execution was performed on a first virtual machine. The processing device may then identify a first timestamp associated with a first instruction of the first thread and a second timestamp associated with a second instruction of the second thread. The processing device may also execute, using the execution record, the first instruction by a first replay thread of a second virtual machine and the second instruction by a second replay thread of the second virtual machine in an order specified by the first timestamp and the second timestamp.

The modules, components and other features described herein (for example in relation to FIGS. 1 and 2) can be implemented as discrete hardware components or integrated in the functionality of hardware components such as ASICS, FPGAs, DSPs, SoCs, or similar devices. In addition, the modules can be implemented as firmware or functional circuitry within hardware devices. Further, the modules can be implemented in any combination of hardware devices and software components, or only in software.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "recording", "receiving", "determining", "executing", "performing", "interpreting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The terms "first", "second", "third", "fourth", etc. as used herein are meant as labels to distinguish among different elements and may not necessarily have an ordinal meaning according to their numerical designation.

Implementations of the present disclosure also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description above. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other implementations will be apparent to those of skill in the art upon reading and understanding the above description. Although the present disclosure has been described with reference to specific exemplary implementations, it will be recognized that the disclosure is not limited to the implementations described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

In the above description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

What is claimed is:

1. A method comprising:
   receiving, by a processing device, a first instruction identifier identifying a first instruction being executed by a first thread associated with a first virtual machine, wherein the first thread utilizes a first data element for execution of the first instruction;
   receiving a second instruction identifier identifying a second instruction being executed by a second thread associated with the first virtual machine;
   producing an execution record comprising the first instruction identifier, a first thread identifier identifying the first thread, a first timestamp reflecting a first real-time clock value associated with executing the first instruction by the first thread associated with the first virtual machine, the second instruction identifier, a second thread identifier identifying the second thread, a second timestamp reflecting a second real-time clock value associated with executing the second instruction by the second thread associated with the first virtual machine, and a third timestamp that indicates when the first virtual machine used the first data element to execute the first instruction; and
   executing, using the execution record, the first instruction by a first replay thread of a second virtual machine and the second instruction by a second replay thread of the second virtual machine in an order specified by the first timestamp and the second timestamp, wherein executing the first instruction by the first replay thread comprises:
      acquiring a value of the first data element in view of the first timestamp and the third timestamp; and
      executing the first instruction by the first replay thread using the acquired value of the first data element.

2. The method of claim 1, further comprising:
   receiving a first output value generated by executing the first instruction by the first virtual machine;
   determining a second output value generated by executing the first instruction by the second virtual machine; and
   generating an indication of an error in response to the first output value not being the same as the second output value.

3. The method of claim 1, further comprising storing the first data element utilized for execution of the first instruction by the first thread.

4. The method of claim 3, further comprising:
   determining that the first data element used for execution of the first instruction is not available for a replay; and
   causing a recorded value of the first data element to be used to execute the first instruction by the second virtual machine.

5. The method of claim 1, wherein producing the execution record further comprises storing a first source code statement associated with the first instruction to a file associated with the execution record.

6. The method of claim 1, wherein the virtual machine is a Java virtual machine.

7. The method of claim 1, wherein the execution record is represented by an extensible markup language (XML) file.

8. An apparatus comprising:
   a memory; and
   a processing device operatively coupled to the memory, the processing device to:
      receive a request to replay an execution of a program based on an execution record, wherein the execution record identifies a first thread and a second thread and wherein the execution was performed on a first virtual machine;
      identify a first timestamp associated with execution of a first instruction of the first thread by the first virtual machine, a second timestamp associated with execution of a second instruction of the second thread by the first virtual machine, and a third timestamp that indicates when the first thread utilized a first data element for execution of the first instruction; and
      execute, using the execution record, the first instruction by a first replay thread of a second virtual machine and the second instruction by a second replay thread of the second virtual machine in an order specified by the first timestamp and the second timestamp, wherein the processing device is further to:
  acquire a value of the first data element in view of the first timestamp and the third timestamp; and
  execute the first instruction by the first replay thread using the acquired value of the first data element.

9. The apparatus of claim 8, wherein to execute the first instruction by the first replay thread, the processing device is further to:
  determine that the first data element associated with the first instruction is not available at a time associated with the replay; and
  use the value of the first data element to execute the first instruction by the second virtual machine.

10. The apparatus of claim 8, wherein the first virtual machine is a Java virtual machine.

11. The apparatus of claim 8, wherein, to execute, using the execution record, the first instruction by the first replay thread of a second virtual machine and the second instruction by the second replay thread of the second virtual machine in the order specified by the first timestamp and the second timestamp, the processing device is further to:
  determine, based on the second timestamp, that a next instruction to execute is the second instruction; and
  pause the execution of the first replay thread to execute the second instruction of the second thread by the second replay thread based on the determination.

12. The apparatus of claim 8, wherein the execution record is an extensible markup language (XML) file.

13. A non-transitory computer-readable medium having instructions encoded thereon which, when executed by a processing device, cause the processing device to:
  receive, by an execution recorder executed by the processing device, a first notification of a first instruction executed by a first thread of a first virtual machine, wherein the first thread utilizes a first data element for execution of the first instruction;
  receive a second notification of a second instruction executed by a second thread of the first virtual machine;
  produce an execution record comprising the first instruction, a first thread identifier, a first timestamp associated with executing the first instruction by the first thread of the first virtual machine, the second instruction identifier, a second thread identifier, a second timestamp associated with executing the second instruction by the second thread of the first virtual machine, and a third timestamp that indicates when the first virtual machine used the first data element to execute the first instruction; and
  execute the first instruction by a first replay thread of a second virtual machine and the second instruction by a second replay thread of the second virtual machine in an order specified by the first timestamp and the second timestamp, wherein the processing device is further to:
    acquire a value of the first data element in view of the first timestamp and the third timestamp; and
    execute the first instruction by the first replay thread using the acquired value of the first data element.

14. The non-transitory computer-readable medium of claim 13, wherein the instructions further cause the processing device to:
  receive a first output value generated by executing the first instruction by the first virtual machine;
  determine a second output value generated by executing the first instruction by the second virtual machine; and
  generate an indication of an error in response to the first output value not being the same as the second output value.

15. The non-transitory computer-readable medium of claim 13, wherein the instructions further cause the processing device to store, by the execution recorder, the first data element utilized for execution of the first instruction by the first thread.

16. The non-transitory computer-readable medium of claim 15, wherein the instructions further cause the processing device to:
  determine that the first data element used for execution of the first instruction is not available for a replay; and
  use a recorded data value of the first data element to execute the first instruction by the second virtual machine.

17. The non-transitory computer-readable medium of claim 13, wherein the instructions further cause the processing device to store a first source code statement associated with the first instruction to a file associated with the execution record.

18. The non-transitory computer-readable medium of claim 13, wherein the virtual machine is a Java virtual machine.

19. The non-transitory computer-readable medium of claim 13, wherein the execution record is represented by an extensible markup language (XML) file.

20. The non-transitory computer-readable medium of claim 13, wherein the first timestamp reflects a first real-time clock value associated with executing the first instruction by the first virtual machine.

* * * * *